United States Patent [19]

Nagashima et al.

[11] Patent Number: 5,607,207
[45] Date of Patent: Mar. 4, 1997

[54] HYDRAULIC BRAKING PRESSURE CONTROL APPARATUS FOR AUTOMOTIVE VEHICLE

[75] Inventors: Takashi Nagashima, Nukata-gun; Michiharu Nishii, Toyota, both of Japan

[73] Assignee: Aisin Seiki Kabushiki Kaisha, Aichi, Japan

[21] Appl. No.: 493,742

[22] Filed: Jun. 22, 1995

[30] Foreign Application Priority Data

Jun. 30, 1994 [JP] Japan .................................... 6-149647

[51] Int. Cl.$^6$ .............................................. B60T 8/32
[52] U.S. Cl. ........................ 303/113.1; 60/413; 60/545; 188/356; 303/113.3; 303/119.1
[58] Field of Search ................... 303/113.3, 113.2, 303/113.1, 116.1, 116.2, 116.3, 116.4, 10–12, 68–69, 115.1–115.6, 117.1, 119.1, 119.2, 114.1, 114.2, 114.3, 113.4; 60/413, 545; 188/345, 355–359; D12/180, 179, 218; 137/884, 596.17, 596.16

[56] References Cited

U.S. PATENT DOCUMENTS

| 3,586,388 | 6/1971 | Stelzer ................................ 303/114.2 |
| 3,827,763 | 8/1974 | Kobashi et al. ...................... 303/114.1 |
| 4,025,124 | 5/1977 | Fuchs .................................. 303/116.4 |
| 4,206,605 | 6/1980 | Mehren et al. ....................... 60/545 |
| 4,346,942 | 8/1982 | Leiber ................................. 303/114.1 |
| 4,626,045 | 12/1986 | Takei et al. ......................... 303/119.2 |
| 4,655,511 | 4/1987 | Leiber ................................. 60/545 X |
| 4,705,324 | 11/1987 | Kervagoret .......................... 303/119.2 |
| 4,778,224 | 10/1988 | Leiber ................................. 303/114.2 |
| 4,796,958 | 1/1989 | Brown, Jr. . |
| 4,813,448 | 3/1989 | Leiber ................................. 303/113.1 |
| 4,819,996 | 4/1989 | Belart et al. ........................ 303/50 |
| 4,869,562 | 9/1989 | Kaes .................................. 303/119.2 |
| 4,932,727 | 6/1990 | Wagner et al. ....................... 303/114.3 |
| 4,967,560 | 11/1990 | Konishi ............................... 60/545 |
| 4,976,105 | 12/1990 | Horiuchi et al. .................... 60/413 |
| 4,998,781 | 3/1991 | Kehl et al. .......................... 303/116.4 |
| 5,011,238 | 4/1991 | Brown, Jr. . |
| 5,072,996 | 12/1991 | Heibel et al. ....................... 303/114.3 |
| 5,181,769 | 1/1993 | Schiel et al. ....................... 303/114.3 |
| 5,186,524 | 2/1993 | Burgdorf et al. .................... 303/10 |
| 5,228,289 | 7/1993 | Norton ................................ 303/10 |

FOREIGN PATENT DOCUMENTS

| 0068984 | 1/1983 | European Pat. Off. ............. 137/884 |
| 3609974 | 10/1986 | Germany ........................... 303/119.1 |
| 3831255 | 3/1989 | Germany ........................... 137/884 |
| 3806787 | 9/1989 | Germany ........................... 303/114.1 |
| 4244166 | 6/1994 | Germany ........................... 303/113.1 |
| 402189259 | 7/1990 | Japan ............................... 303/119.2 |
| 3189487 | 8/1991 | Japan ............................... 137/884 |
| 4118351 | 4/1992 | Japan ............................... 303/119.2 |

*Primary Examiner*—Douglas C. Butler
*Attorney, Agent, or Firm*—Hazel & Thomas

[57] ABSTRACT

A hydraulic braking pressure control apparatus for an automotive vehicle, having a master cylinder integrally provided with an ABS actuator or an ABS actuator and a TRC actuator, the ABS actuator being in the form of an anti-lock actuator which is activated under control of a computer for controlling hydraulic braking pressure applied to each road wheel of the vehicle in braking operation, and the TRC actuator being in the form of a traction control actuator which is activated under control of the computer for controlling slippage of driven road wheels during travel of the vehicle, wherein a solenoid valve assembly composed of a plurality of solenoid valves of the ABS actuator or the ABS and TRC actuators is mounted on one side of a cylinder body of the master cylinder, while other component parts of the ABS actuator or the ABS and TRC actuators are mounted within a housing structure integrally formed with the cylinder body of the master cylinder a the other side thereof.

6 Claims, 9 Drawing Sheets

HYDRAULIC BRAKING PRESSURE CONTROL APPARATUS FOR AUTOMOTIVE VEHICLE

BACKGROUND OF THE INVENTION

1. Field of the Invention

The present invention relates to a hydraulic braking pressure control apparatus for an automotive vehicle, and more particularly to a hydraulic braking pressure control apparatus of the type which includes a brake master cylinder and an ABS actuator or an ABS actuator and a TRC actuator, wherein the ABS actuator is in the form of a well known anti-lock actuator which is activated under control of an anti-lock control computer for controlling hydraulic braking pressure applied to each road wheel of the vehicle in braking operation, and wherein the TRC actuator is in the form of a well known traction control-actuator which is activated under control of a traction control computer for controlling slippage of driven road wheels during travel of the vehicle.

2. Description of the Prior Art

In recent years, there has been developed a hydraulic braking pressure control apparatus of the type which includes a master cylinder integrally provided with he ABS actuator or the ABS and TRC actuators. In such a conventional braking pressure control apparatus, all the component parts of the actuators are integrally assembled with the cylinder body of the master cylinder or separately mounted on the cylinder body of the master cylinder.

In the case that the actuator assembly is mounted on the cylinder body of the master cylinder, a relatively large space is occupied for arrangement of the actuator assembly, and the center of gravity of the control apparatus is one-sided due to the weight of the actuator assembly. As a result, there is difficulty in mounting of the control apparatus to a vehicle body structure, and a firm support structure is required for support of the control apparatus. In the case that the component parts of the actuator are separately mounted on the cylinder body of the master cylinder, it is required to provide mounting portions on the cylinder body for the respective component parts. This means that various kinds of cylinder bodies are required for different kinds of actuators. During mounting process of the component parts, it is required to mount the component parts of the actuator on the cylinder body respectively by means of fasting bolts, etc.

SUMMARY OF THE INVENTION

It is, therefore, a primary object of the present invention to provide a hydraulic braking pressure control apparatus capable of overcoming the problems discussed above.

According to the present invention, the,object is accomplished by providing a hydraulic braking pressure control apparatus for an automotive vehicle, having a master cylinder integrally provided with an ABS actuator or an ABS actuator and a TRC actuator, the ABS actuator being in the form of an anti-lock actuator which is activated under control Of a computer for controlling hydraulic braking pressure applied to each road wheel of the vehicle in braking operation, and the TRC actuator being in the form of a traction control actuator which is activated under control of the computer for controlling slippage of driven road wheels during travel of the vehicle, wherein a solenoid valve assembly composed of a plurality of solenoid valves of the ABS actuator or the ABS actuator and TRC actuator is mounted on one side of a cylinder body of the master Cylinder, while other component parts o the ABS actuator or the ABS and TRC actuators are mounted within a housing structure integrally formed with the cylinder body of the master cylinder at the other side thereof.

BRIEF DESCRIPTION OF THE DRAWINGS

Other objects, features and advantages of the present invention will be more readily appreciated from the following detailed description of certain preferred embodiments thereof when taken together with the accompanying drawings, in which.

DESCRIPTION OF THE PREFERRED EMBODIMENTS

Figure 1:
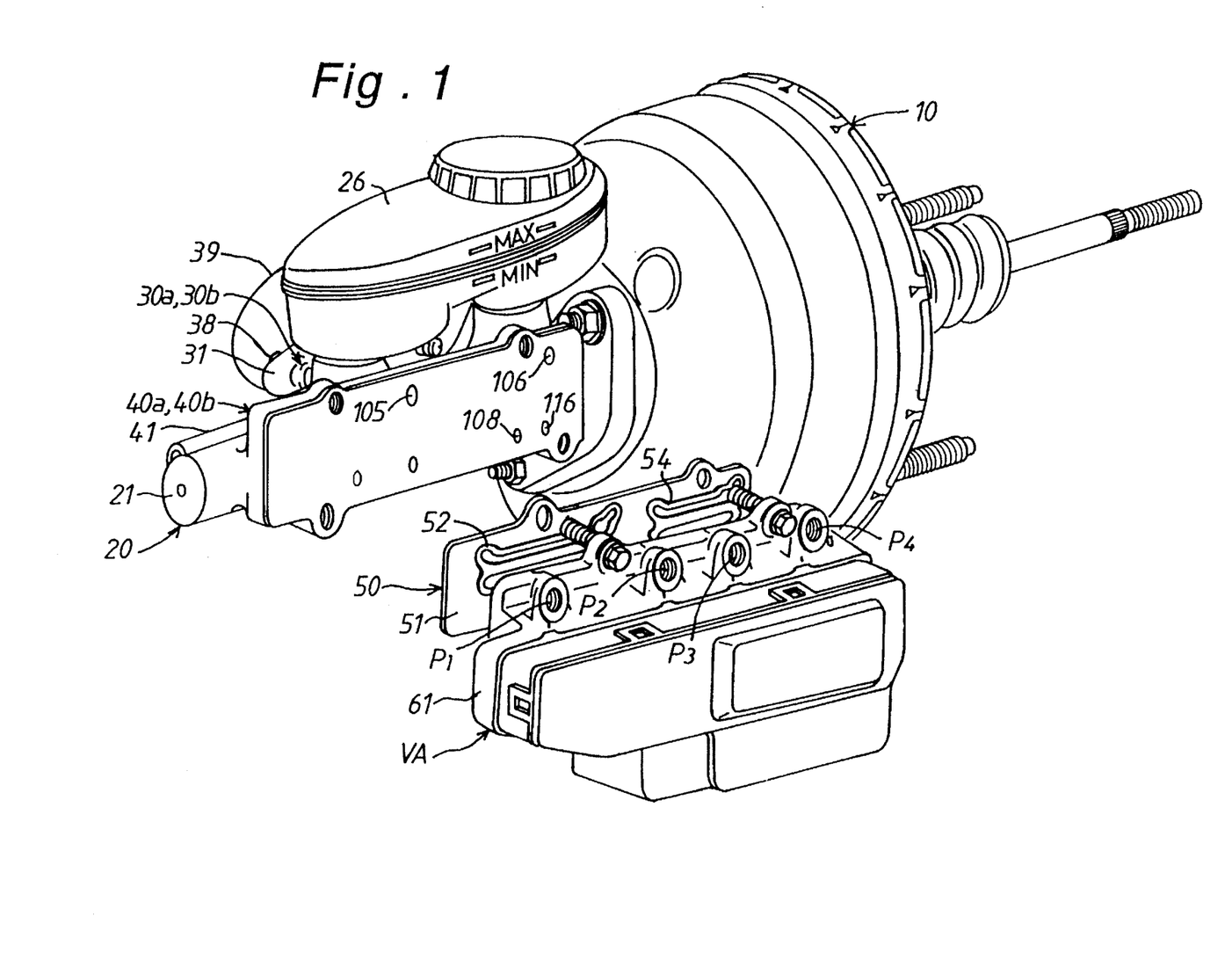
FIG. 1 is a perspective view of a hydraulic braking pressure control apparatus in accordance with the present invention.
Figure 2:
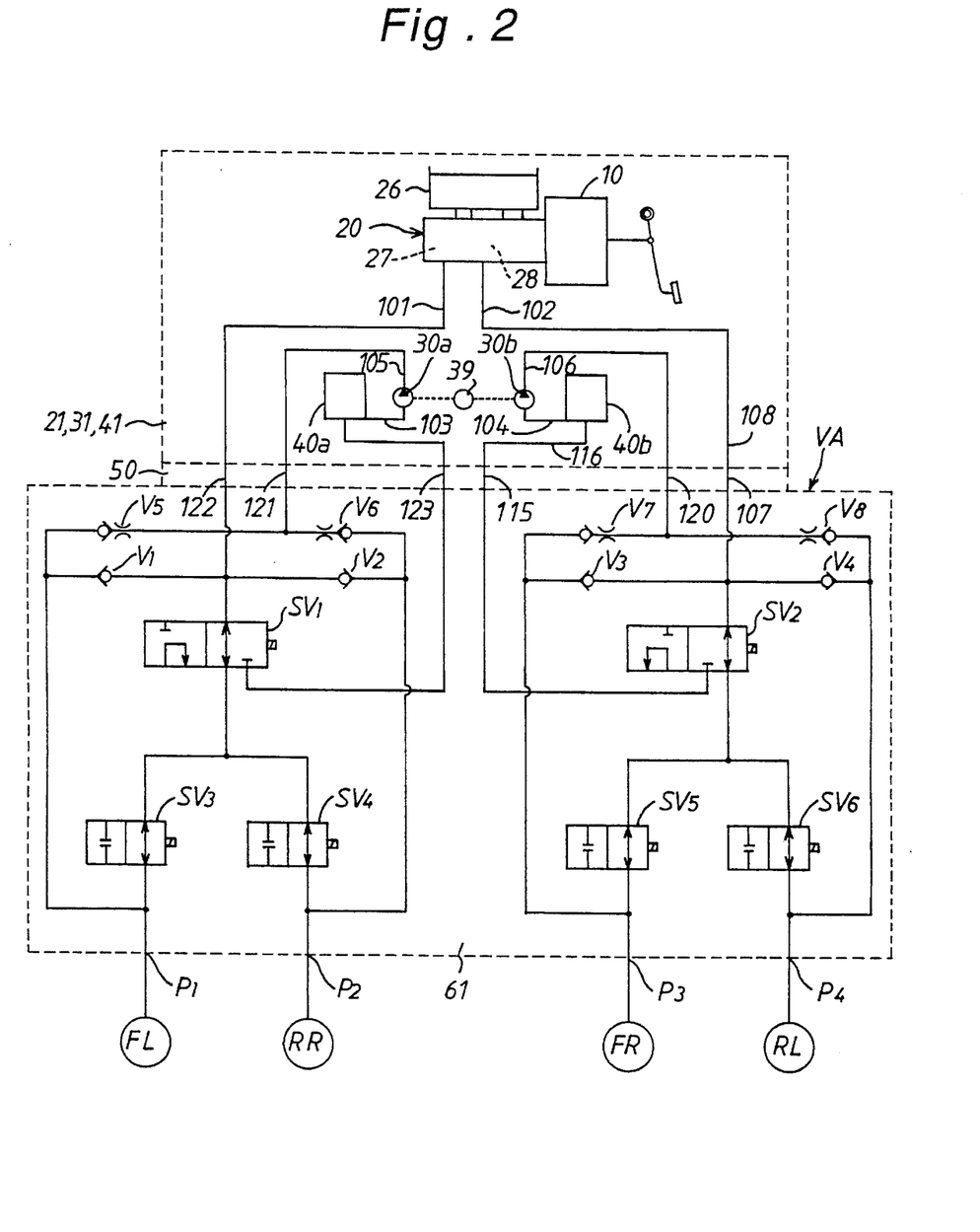
FIG. 2 is a diagram of a hydraulic braking pressure control circuit of the control apparatus shown in FIG. 1.

In FIG. 1 of the drawings, there is illustrated a hydraulic braking pressure control apparatus in accordance with the present invention, which includes a vacuum type brake booster 10 mounted on a dash panel (not shown) of a vehicle body, a tandem master cylinder 20 integrally assembled with the brake booster 10, a pair of hydraulic pumps 30a, 30b, a pair of actuator reservoirs 40a, 40b integrally assembled with the master cylinder 20, and a solenoid valve assembly VA detachably mounted on the master cylinder 20 through a sealing plate 50 o provide a hydraulic braking pressure control circuit for an automotive vehicle of front-engine front-drive type shown in FIG. 2. In the hydraulic braking pressure control circuit, one of dual pressure chambers of the master cylinder 20 is connected a wheel cylinder FL of a left-hand front wheel brake and a wheel cylinder RR of a right-hand rear wheel brake, while the other pressure chamber of the master cylinder 20 is connected to a wheel cylinder FR of a right-hand front wheel brake and a wheel cylinder RL of a left-hand rear brake.

Figure 3:
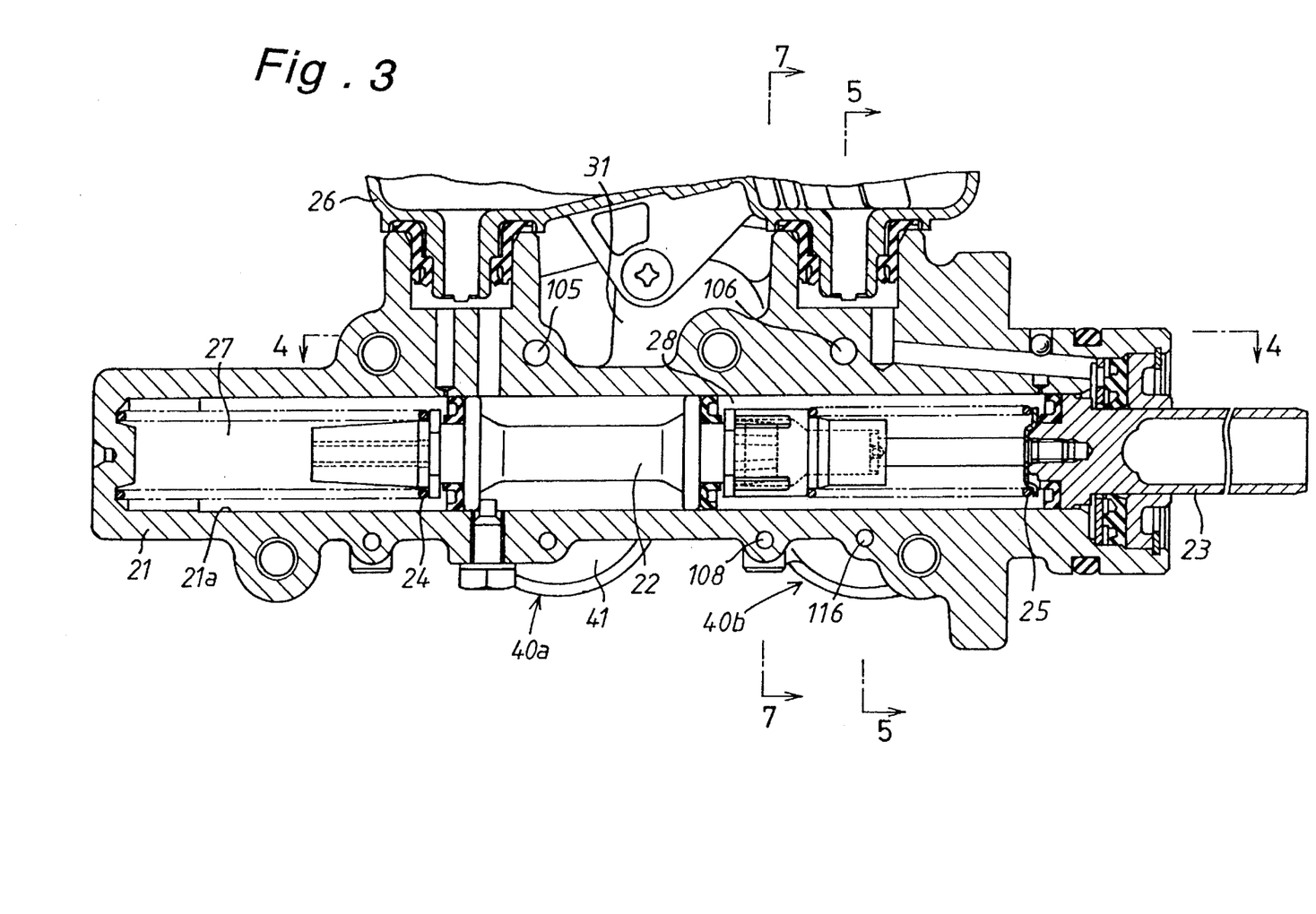
FIG. 3 is a sectional view of a tandem master cylinder shown in FIG. 1.
Figure 7:
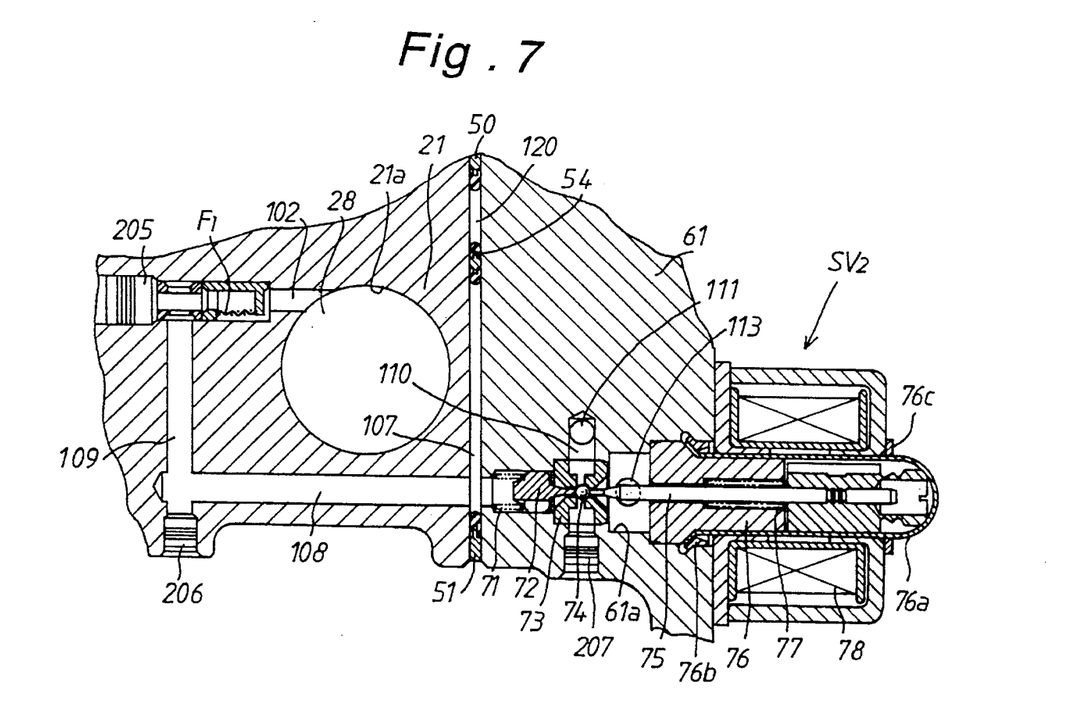
FIG. 7 is a partly sectional view taken along line 7—7 in FIG. 3.

As shown in FIG. 3, the tandem master cylinder 20 includes an aluminum cylinder body 21, a pair of axially spaced pistons 22, 23 and a pair of spaced return springs 24, 25 coaxially disposed within an axial bore 21a of cylinder body 21 and a fluid reservoir 26 mounted on he cylinder body 21 in a liquid-tight manner. In FIG. 3, the dual pressure chambers of the master cylinder 20 are designated by the reference numerals 27, 28 and formed by the pistons 22, 23 in the axial bore 21a of cylinder body 21. As shown in FIGS. 2 and 7, the pressure chambers 27, 28 are respectively connected to fluid passages 101, 102 formed in the cylinder body 21.

Figure 4:
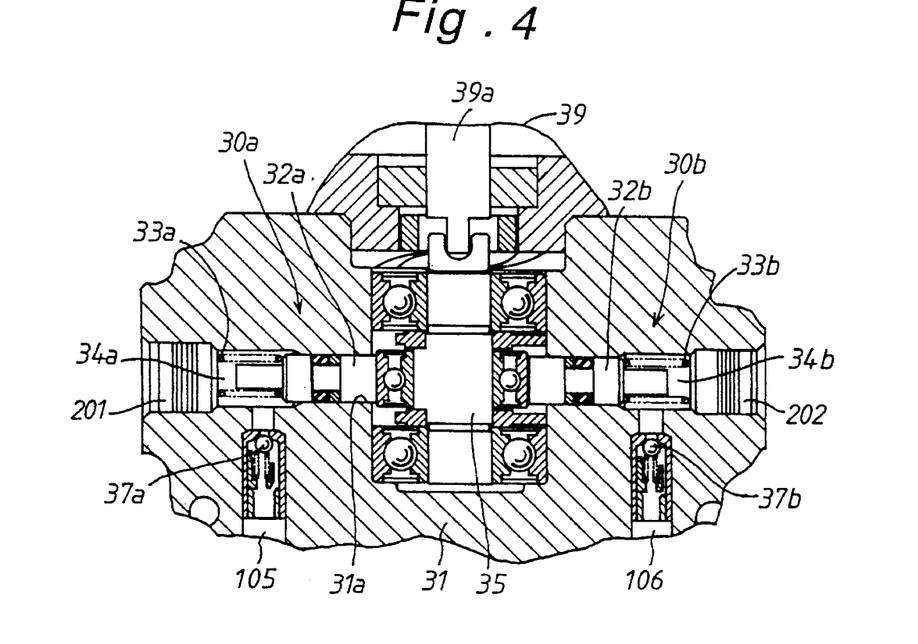
FIG. 4 is a partly sectional view taken along line 4—4 in FIG. 3.
Figure 5:
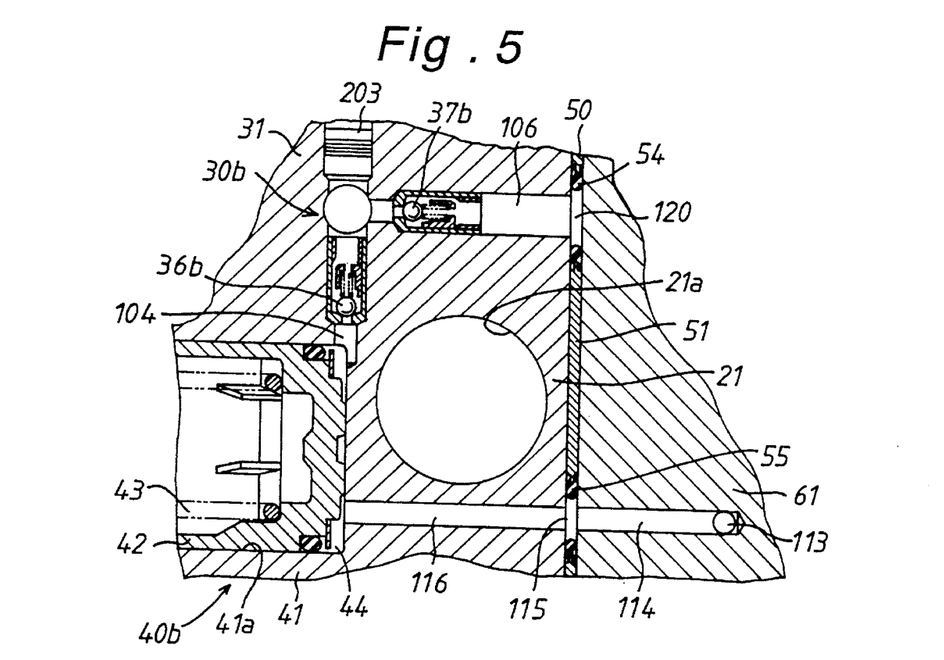
FIG. 5 is a partly sectional view taken along line 5—5 in FIG. 3.

As shown in FIGS. 1, 2 4 and 5, the hydraulic pumps 30a, 30b each are composed of a pump body or housing structure 31 integrally formed with the cylinder body 21 at an upper portion of the axial bore 21a, a pair 0f axially spaced pistons 32a, 32b coaxially disposed within an axial bore 31a formed in the pump body 31 to form a pair of pump chambers 34a, 34b, a pair of return springs 33a, 33b coaxially disposed within he axial bore 31a to bias the pistons 32a, 32b inwardly, a cam shaft 35 mounted for rotary movement within the pump body 31 to cooperate the return springs 33a, 33b for reciprocating the pistons 32a, 32b, a pair of suction check valves 36b (one of which is shown in FIG. 5) disposed within fluid passages 103, 104 connecting the pump chambers 34a, 34b to each accumulation chamber 44 of actuator reservoirs 40a, 40b (one of which is shown In FIG. 5) to permit the flow of fluid into the pump chambers 34a, 34b from the accumulation chambers 44, a pair of discharge check valves 37a, 37b disposed within discharge passages 105. 106 of the pump chambers 34a, 34b to permit the flow of fluid discharged from the pump chambers 34a, 34b, and an electric motor 39 mounted on one side portion of the pump body 31 by means of bolts 38 and drivingly connected to the cam shaft 35 through a rotary shaft 39a to rotate the cam shaft 35. In addition, opposite ends of he axial bore 31a are closed by a pair of axially spaced plugs 201, 202 in a liquid-tight manner as shown in FIG. 4, and one end of the fluid passage 104 is closed by a plug 203 in a liquid-tight manner as shown in FIG. 5.

As shown in FIG. 5, each of the actuator reservoirs 40a, 40b is composed of a reservoir body or housing structure 41 integrally formed with the cylinder body 21 at a position adjacent the axial bore 21a, a piston 42 movably disposed within an axial cylinder bore 41a formed in the reservoir body 41 to form the accumulation chamber 44, and a coil spring 43 disposed within the cylinder bore 41a to bias the piston 42 toward the accumulation chamber 44. The coil spring 43 is engaged at one end thereof with a plug (not shown) threaded into the reservoir body 41 and at the other end thereof with the piston 42. In the respective actuator reservoirs 40a, 40b, hydraulic brake fluid from a solenoid valve SV2 is returned into the accumulation chamber 44 through a fluid passages 113, 114, 115, 116 and supplied into the pump 30b through the suction check valve 36b.

Figure 6:
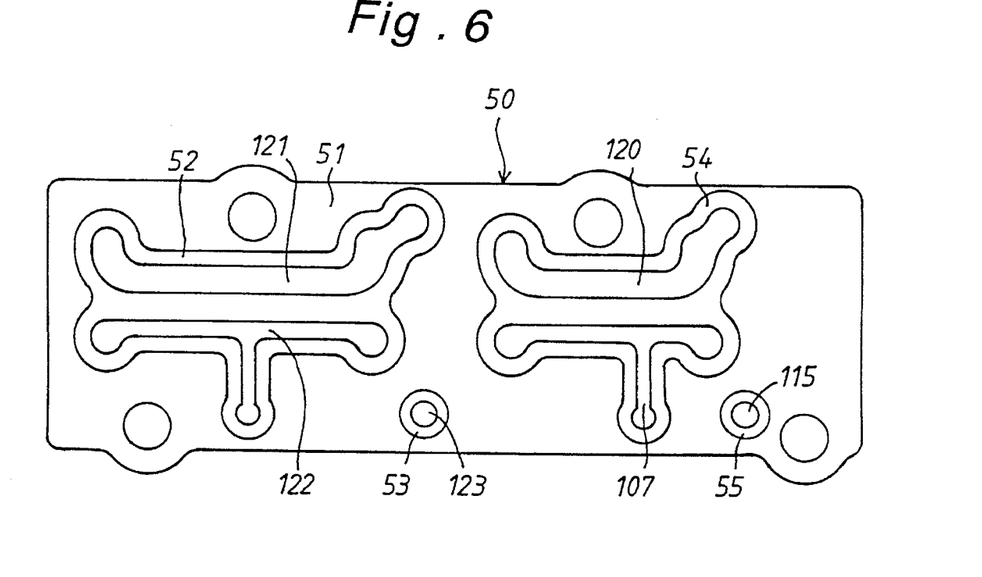
FIG. 6 is a front view of a sealing pate shown in FIG. 1.

As shown in FIGS. 1, 3 and 6, the sealing plate 50 is in the form of a plate body 51 which is formed with mounting holes for bolts and rubber seals 52, 53, 54, 55. As shown in FIG. 6, the rubber seals 52, 53, 54, 55 are coupled within the corresponding mounting holes to form fluid communication passages 107, 115, 120, 121, 122 and 123.

As shown in FIG. 2, the solenoid valve assembly VA includes a pair of solenoid valves SV1, SV2 of the three-port two-position type, four solenoid valves SV3, SV4, SV5, SV6 of the two-port two-position type, four check valves V1, V2, V3, V4 and four check valves V5, V6, V7, V8 each provided with an orifice. The solenoid valves SV1–SV6 and check valves V1–V8 are mounted within a single aluminum valve body 61 shown in FIG. 1. As shown in FIGS. 1 and 2, the valve body 61 is formed with ports P1, P2, P3, P4 respectively connected to the wheel cylinders FL, RR, FR, RL through conduits (not shown).

As shown in FIG. 7, the solenoid valve SV2 includes a return spring 71, a poppet valve element 72, a valve seat 73, a ball valve 74, a movable core needle 75, a stationary core 76 and a return spring 77 which are coaxially disposed within a stepped axial bore 61a of the aluminum valve body 61. The solenoid valve SV2 further includes a sleeve-like casing 76a fixed to the valve body 61 and an electromagnetic solenoid 78 mounted on the casing 76a and fixed in place by means of a retainer ring 76c.

Figure 8:
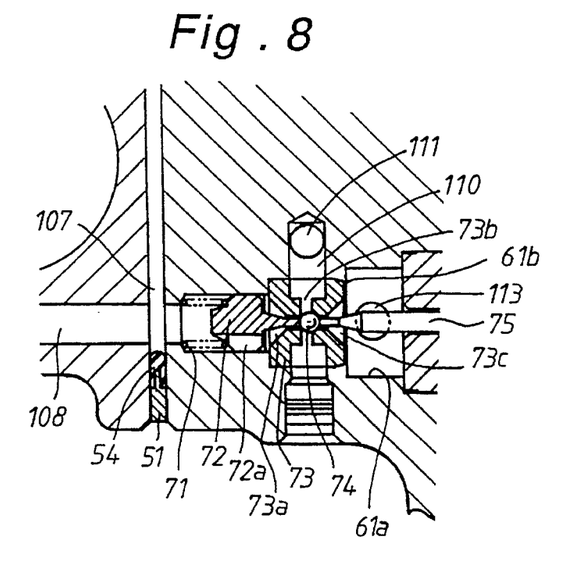
FIG. 8 is an enlarged sectional view of a ball valve assembly shown in FIG. 7.
Figure 9:
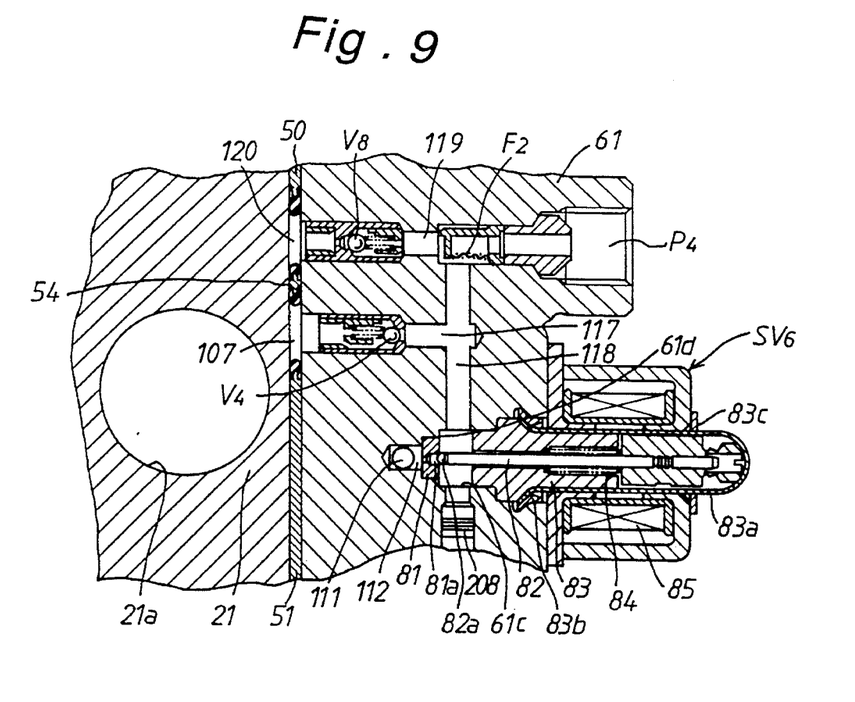
FIG. 9 is a partly sectional view illustrating a relationship among a solenoid valve a check valve and a check valve with an orifice shown in FIG. 2.

As clearly shown in FIG. 8, the valve seat 73 is formed with three valve holes 73a, 73b, 73c and fixed in place by caulking within the stepped bore 61a of valve body 61 in a liquid-tight manner. As shown in FIG. 7, the valve hole 73a of valve seat 73 is communicated with a fluid passage 102 in open communication with the pressure chamber 28 of master cylinder 20 through fluid passages 107, 108 and 109. The fluid passage 107 is formed by the rubber seal 54 assembled with the sealing plate 50 to provide fluid communication between a small diameter portion of stepped bore 61a and the fluid passage 108. As shown in FIGS. 8 and 9, the valve hole 73b is communicated at its inner end with the valve hole 73a and at its outer end with the solenoid valve SV6 through fluid passages 110, 111 and 112. The valve hole 73c is positioned coaxially with the valve hole 73a and communicated at its inner end with the valve hole 73b. The valve hole 73c is communicated at its outer end with a fluid passage 113 which is communicated with the accumulation chamber 44 of actuator reservoir 40b through fluid passages 114, 115 and 116 as shown in FIG. 5. The fluid passage 115 is formed by the rubber seal 55 assembled with the sealing plate 50. The ball valve 74 is contained within the valve seat 73 to close either one of the valve holes 73a and 73c.

As shown in FIG. 7, the fluid passages 102, 109 and 110 are closed at their outer ends by means of plus 205, 206 and 207, and a filter F1 is disposed within the fluid passage 102 to eliminate foreign particles therefrom. As shown in FIG. 9, the fluid passage 107 formed by the rubber seal 54 is communicated with the port. P4 through fluid passages 117, 118 and 119, and the port P4 is connected to the wheel cylinder RL of the left-hand rear wheel brake through a conduit (not shown). Disposed within the fluid passage 117 is the check valve V4 which is arranged to permit the flow of hydraulic braking fluid returned into the pressure chamber 28 of master cylinder 20 from the wheel cylinder RL when braking operation has been released. In addition, a filter F2 is disposed within the fluid passage 119 to eliminate foreign particles therefrom.

As-shown in FIGS. 7 and 8, the popper valve element 72 is formed with an axial groove 72a and disposed within the small diameter portion of stepped bore 61a for axial movement. The poppet valve element 72 is loaded by the return spring 71 toward the ball valve 74 and maintained in engagement with the ball valve 74 at its right-hand distal end. The movable core needle 75 is axially slidably supported by the stationary core 78 and opposed at its inner end to the poppet valve element 72 The movable core needle 75 is loaded by the return spring 77 outwardly. The stationary core 78 is fixed to the valve body 61 together with the sleeve-like casing 76a in a liquid-tight manner by means of a retainer ring 76b. When the electromagnetic solenoid 78 is energized, the core needle 75 is moved against the return spring 77 toward the ball valve 74 to move the ball valve 74 and poppet valve element 72 against the return spring 71. Thus, the ball valve 74 acts to close the valve hole 73a and open the valve hole 73c in response to energization of the solenoid 78 and to open the valve hole 73a and close the valve hole 73c in response to deenerization of he solenoid 78.

As shown in FIG. 9, the two-port two-position solenoid valve SV6 includes a valve seat 81, a movable core needle 82, a stationary core 83 and a return spring 84 which are coaxially disposed within a stepped bore 61c formed in the valve body 61. The solenoid valve SV6 further includes a sleeve-like casing 83a fixed to the valve body 61 and an electromagnetic solenoid 85 mounted on the casing 83a and fixed in place by means of a retainer ring 83c.

The valve seat 81 is disposed within a small diameter portion of stepped bore 61c and fixed in place by caulking, at an internal shoulder 81d in a liquid-tight manner. As shown in FIGS. 8 and 9, the valve seat 81 has a valve hole 81a which is communicated at one side thereof with the valve hole 73b of solenoid valve SV2 through fluid passages 112, 111 and 110 and at the other side thereof with the port P4 through fluid passages 118 and 119. The valve hole 81a is arranged to be closed by the inner end of the movable core needle 82. The fluid passage 119 is formed coaxially with the port P4 and provided therein with the check valve V8 with an orifice. As shown in FIGS. 9 and 5, the fluid passage 119 is communicated with the fluid passage 106 through a fluid passage 120 formed by the rubber seal 54 of sealing plate 50. The fluid passage 106 is provided therein with an exhaust check valve 37b which permits the flow of fluid under pressure discharged from the pump 30b into the fluid passage 106 therethrough. Thus, the fluid under pressure from the pump 30b is supplied to the port P4 through the fluid passage 120 and the check valve V8 in the fluid passage 119.

The movable core needle 82 is axially slidably supported by the stationary core 83 and loaded by the return spring 84 outwardly. The stationary core 83 is fixed to the valve body 61 together with the sleeve-like casing 83a by means of a retainer ring 83b in a liquid-tight manner. When the electromagnetic solenoid 84 is energized, the core needle 82 is moved against the return spring 84 toward the valve seat 81. Thus, the inner end 82a of core needle 82 acts to open the valve hole 81a during deenerization of the solenoid 85 and to close the valve hole 81a in response to energization of the solenoid 85.

In the hydraulic braking pressure control apparatus shown in FIG. 1, the actuator reservoir 40a, solenoid valves SV1, SV3, SV4, SV5, check valves V1–V3 and check valves V5–V7 are assembled substantially in the same manner as the actuator reservoir 40b, solenoid valves SV2, SV6, check valves V4 and V8 and interconnected as shown in FIG. 2 through respective fluid passages which are formed in he same manner as the fluid passages shown in FIGS. 5–9.

As is understood from the above description, the pump body 31 and the actuator reservoir body 41, except for the solenoid valves SV1–SV6, are integrally formed with the cylinder body 21 of the master cylinder 20. This is useful to make the hydraulic braking pressure control apparatus small in size by common use of the cylinder body 21. Furthermore, time component parts of the actuator such as the pumps 30a, 30b and actuator reservoirs 40a, 40b are mounted on one side of the cylinder body 21, while the solenoid valve assembly VA is mounted on the other side of the cylinder body 21. This useful to balance the hydraulic braking pressure control apparatus in weight and to put both spaces of the cylinder body 21 to practical use. As a result, the support structure of the braking pressure control apparatus can be simplified without causing any increase of the shell thickness of the brake booster 10. Additionally, the solenoid valves SV1–SV6 can be mounted in a simple manner since they are preliminarily assembled with the solenoid valve assembly SV together the check valves V1–V4 and V5–V8.

In the above embodiment, the cylinder bore 21a of master cylinder 20, the pump bore 31a of pumps 30a, 30b and the cylinder bore 41a of actuator reservoirs 40a, 40b can be applied with alumite treatment separately from the other portions where the alumite treatment is not needed. Since the solenoid valve assembly VA is provided separately from the master cylinder 20, pumps 30a, 30b and actuator reservoirs 40a, 40b, any deformation does not occur in the cylinder bores 21a, 41a and pump bore 31a when the valve seats 73, 81 are fixed in place by caulking and the retainer rings 76b, 83b are pressed into the stepped bores 61a, 61c. This is useful to enhance the quality of the hydraulic braking pressure control apparatus.

Figure 10:
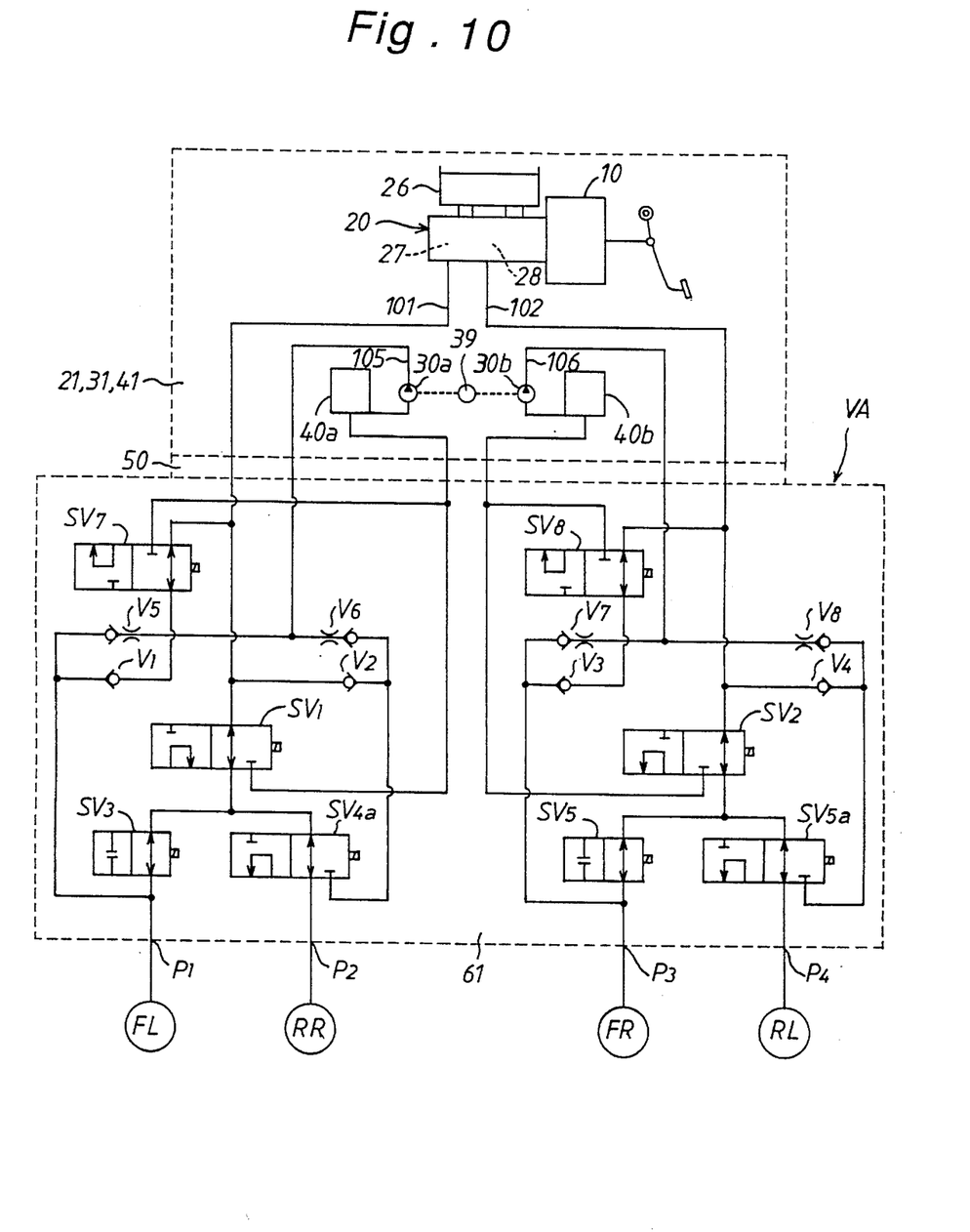
FIG. 10 is a diagram of a modification of the hydraulic braking pressure control circuit shown in FIG. 2.

In FIG. 10 there is illustrated a modification of the hydraulic braking pressure control apparatus which includes an ABS actuator and a TRC actuator integrally assembled with The master cylinder 20. In this modification, the two-port two-position solenoid valves SV4, SV6 shown in Ft. 2 are replaced with three-port two-position solenoid valves SV4a, SV6a, and three-port two-position solenoid valves SV7, SV8 are newly added. The other construction and parts are substantially the same as those in the above embodiment.

Figure 11:
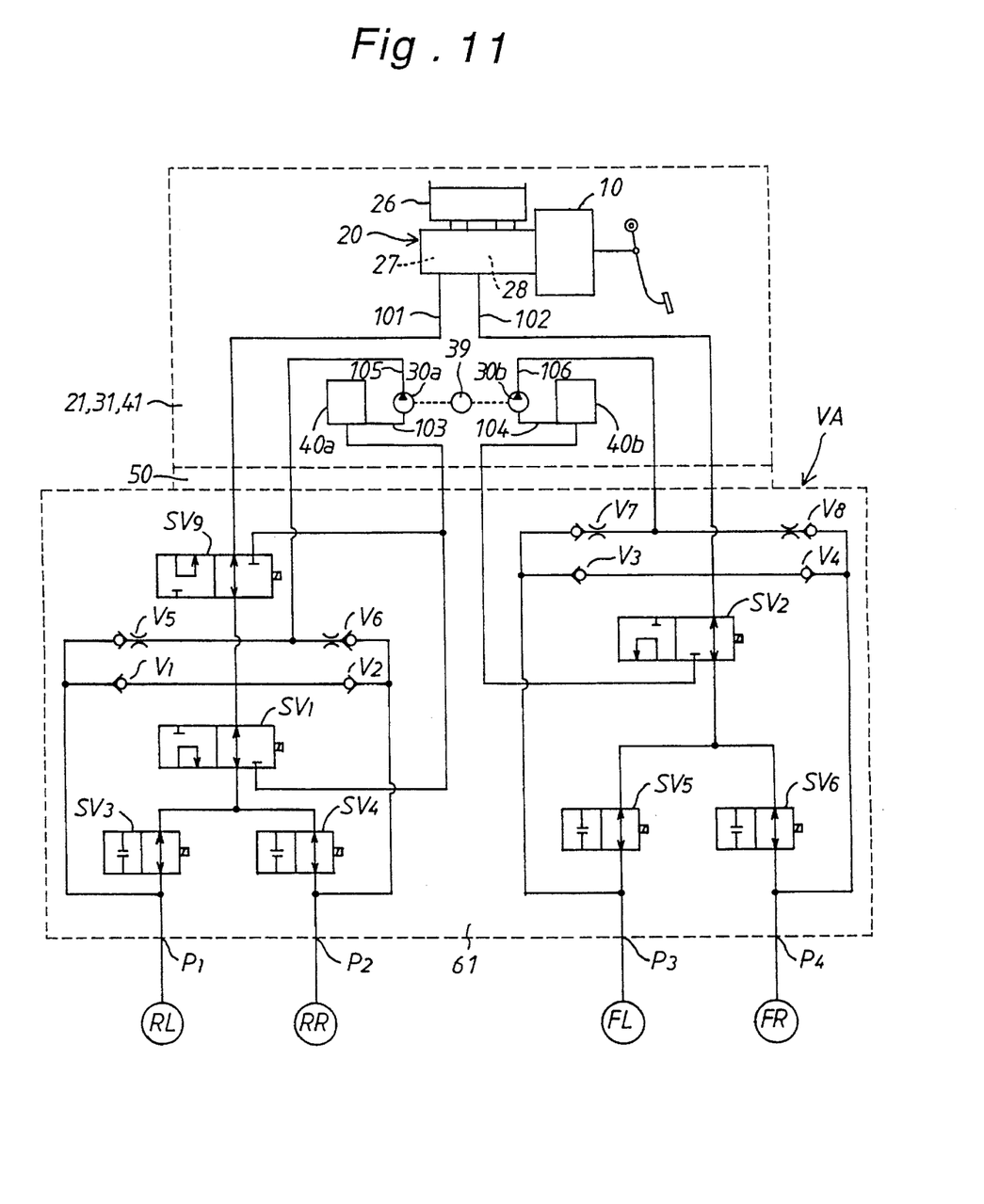
FIG. 11 is a diagram of another modification of the hydraulic braking pressure control circuit shown in FIG. 2.

In FIG. 11 there is illustrated another modification of the hydraulic braking pressure control apparatus which includes an ABS actuator and a TRC actuator integrally assembled with the master cylinder 20 to be used in an automotive vehicle of the front-engine rear wheel-drive type. In this modification, the port P1 is connected to the wheel cylinder RL of the left-hand rear wheel brake, the pork P2 is connected to the wheel cylinder RR of the right-hand rear wheel brake, the port P3 is connected to the wheel cylinder FL of the left-hand front wheel brake, and the port P4 is connected to the wheel cylinder FR of the right-hand front wheel brake. Additionally, a three-port two-position solenoid valve SV7 is newly added. The other construction and parts are substantially the same as those in the above embodiment.

Figure 12:
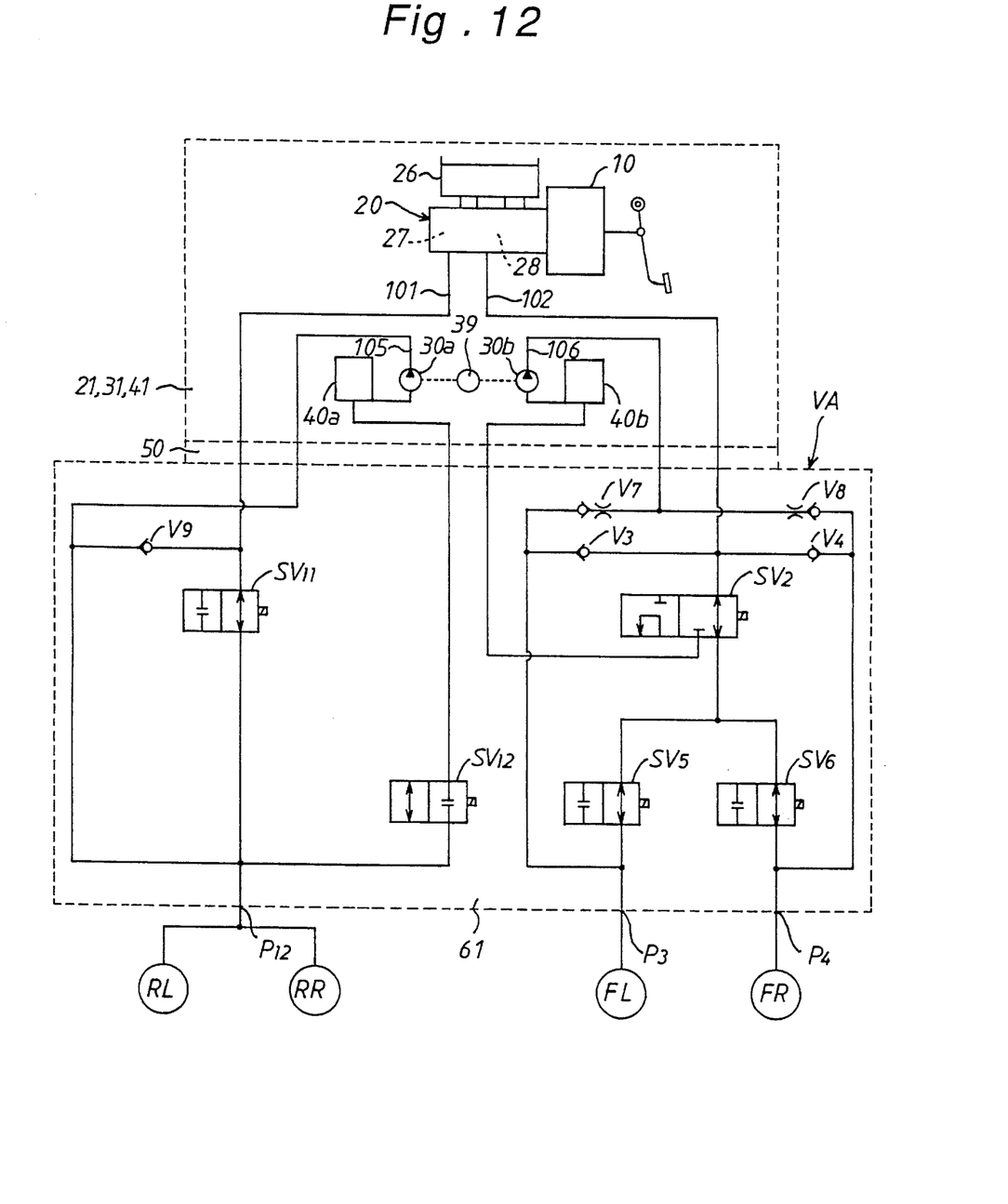
FIG. 12 is a diagram of a further modification of the hydraulic braking pressure control circuit shown in FIG. 2.

In FIG. 12 there is illustrated a further modification of the hydraulic braking pressure control apparatus which includes an ABS actuator integrally assembled with the master cylinder 20 to be used in an automotive vehicle of the front-engine rear wheel-drive type. In this modification, a port 12 is connected to the wheel cylinders RL and RR of the left-hand rear wheel brake and right-hand rear wheel brake, the port P3 is connected to the wheel cylinder FL of the left-hand front wheel brake, and the port P4 is connected to the wheel cylinder FR of the right-hand front wheel brake. Additionally, the solenoid valves SV1, SV3, SV4 and the check valves V1, V2, V5, V6 shown in FIG. 2 are replaced with solenoid valves SV11, SV12 and a check valve V9. The other construction and parts are substantially the same as those in the above embodiment.

What is claimed is:

1. A hydraulic braking pressure control apparatus for an automotive vehicle, comprising:

a master cylinder having a cylinder body with a pressure chamber, said master cylinder being provided thereon with a fluid reservoir;

a hydraulic braking pressure control circuit connecting a plurality of wheel brake cylinders to the pressure chamber and fluid reservoir of said master cylinder, said hydraulic braking pressure control circuit being operatively connected to an electric controller so as to be activated thereby for controlling hydraulic braking pressure applied to the wheel brake cylinders from said master cylinder in braking operation; and an anti-lock actuator integrally provided with said master cylinder, said anti-lock actuator including a plurality of solenoid valves integrally connected with said hydraulic braking pressure control circuit, all of said plurality of solenoid valves being formed within a single valve body separate from said cylinder body of said master cylinder, and a housing structure for housing a remainder of operative components of said anti-lock actuator, wherein said single valve body having all solenoid valves of said anti-lock actuator is fixedly positioned on one side face of said cylinder body, and said housing structure is integrally formed with the cylinder body of said master cylinder at an opposite side face of said cylinder body.

2. A hydraulic braking pressure control apparatus as claimed in claim 1, wherein said cylinder body of said master cylinder and said single valve body are made of aluminum.

3. A hydraulic braking pressure control apparatus as claimed in claim 1, further comprising:

a traction control actuator integrally provided with said anti-lock actuator and said master cylinder, said traction control actuator including a plurality of solenoid valves integrally connected with said hydraulic braking pressure control circuit, all of said pluralities of solenoid valves of said anti-lock actuator and said traction control actuator being formed within said single valve body separate from said cylinder body of said master cylinder, and said housing structure, wherein said single valve body having all solenoid valves of said anti-lock actuator and said traction control actuator is fixedly positioned on one side face of said cylinder body, and said housing structure is integrally formed with the cylinder body of said master cylinder at said opposite side face of said cylinder body.

4. A hydraulic braking pressure control apparatus for an automotive vehicle, comprising:

a master cylinder having a cylinder body with a pressure chamber, said master cylinder being provided thereon with a fluid reservoir;

a hydraulic braking pressure control circuit connecting a plurality of wheel brake cylinders to the pressure chamber and fluid reservoir of said master cylinder, said hydraulic braking pressure control circuit being operatively connected to an electric controller so as to be activated thereby for controlling hydraulic braking pressure applied to the wheel brake cylinders from said master cylinder in braking operation; and an anti-lock actuator integrally provided with said master cylinder, said anti-lock actuator including a plurality of solenoid valves integrally connected with said hydraulic braking pressure control circuit, all of said plurality of solenoid valves being formed within a single valve body separate from said cylinder body of said master cylinder, an accumulation reservoir for accumulating braking fluid under pressure discharged from each of the wheel brake cylinders through each of said plurality of solenoid valves, a hydraulic pump for supplying braking fluid under pressure from said accumulation reservoir into at least one of the fluid reservoir of said master cylinder and each of said wheel brake cylinders, and a housing structure for housing said accumulation reservoir and said hydraulic pump, wherein said single valve body having all solenoid valves of said anti-lock actuator is fixedly positioned on one side face of said cylinder body, and said housing structure having said accumulation reservoir and said hydraulic pump is integrally formed with the cylinder body of said master cylinder at an opposite side face of said cylinder body.

5. A hydraulic braking pressure control apparatus as claimed in claim 4, wherein a sealing plate is disposed between said single valve body and said one side face of said cylinder body.

6. A hydraulic braking pressure control apparatus as claimed in claim 4, further comprising:

a traction control actuator integrally provided with said anti-lock actuator and said master cylinder, said traction control including a plurality of solenoid valves integrally connected with said hydraulic braking pressure control circuit, all of said pluralities of solenoid valves of said anti-lock actuator and said traction control actuator being formed within said single valve body separate from said cylinder body of said master cylinder, said accumulation reservoir, said hydraulic pump, and said housing structure, wherein said single valve body having all solenoid valves of said anti-lock actuator and said traction control actuator is fixedly positioned on one side face of said cylinder body, and said housing structure having said accumulation reservoir and said hydraulic pump is integrally formed with the cylinder body of said master cylinder at said opposite side face of said cylinder body.

* * * * *